(12) United States Patent
Bell

(10) Patent No.: US 9,041,800 B2
(45) Date of Patent: May 26, 2015

(54) CONFINED MOTION DETECTION FOR PAN-TILT CAMERAS EMPLOYING MOTION DETECTION AND AUTONOMOUS MOTION TRACKING

(75) Inventor: Mark Steven Bell, Airville, PA (US)

(73) Assignee: Robert Bosch GmbH, Stuttgart (DE)

( * ) Notice: Subject to any disclaimer, the term of this patent is extended or adjusted under 35 U.S.C. 154(b) by 1152 days.

(21) Appl. No.: 12/704,876

(22) Filed: Feb. 12, 2010

(65) Prior Publication Data

US 2011/0157358 A1 Jun. 30, 2011

Related U.S. Application Data

(60) Provisional application No. 61/291,014, filed on Dec. 30, 2009.

(51) Int. Cl.
*H04N 7/18* (2006.01)
*G08B 13/196* (2006.01)
*G06K 9/00* (2006.01)
*H04N 7/12* (2006.01)

(52) U.S. Cl.
CPC .......... *G08B 13/19606* (2013.01); *H04N 7/181* (2013.01); *G06T 2207/10016* (2013.01)

(58) Field of Classification Search
USPC ........... 348/143, 144, 148, 150, 170; 382/103
See application file for complete search history.

(56) References Cited

U.S. PATENT DOCUMENTS

| | | | |
|---|---|---|---|
| 5,956,424 A | 9/1999 | Wootton et al. | |
| 6,303,920 B1 * | 10/2001 | Wixson | 250/208.1 |
| 6,690,374 B2 | 2/2004 | Park et al. | |
| 7,116,799 B2 * | 10/2006 | Wustefeld et al. | 382/103 |
| 7,643,066 B2 | 1/2010 | Henninger, III et al. | |
| 2004/0150717 A1 * | 8/2004 | Page et al. | 348/148 |
| 2004/0246336 A1 | 12/2004 | Kelly, III et al. | |
| 2005/0007454 A1 * | 1/2005 | Needham | 348/143 |
| 2005/0104958 A1 | 5/2005 | Egnal et al. | |
| 2005/0157169 A1 | 7/2005 | Brodsky et al. | |
| 2005/0275723 A1 | 12/2005 | Sablak et al. | |
| 2006/0176951 A1 * | 8/2006 | Berman et al. | 375/240.01 |
| 2007/0052803 A1 | 3/2007 | Chosak et al. | |

FOREIGN PATENT DOCUMENTS

| | | |
|---|---|---|
| GB | 2429131 A | 2/2007 |
| GB | 2433173 A | 6/2007 |
| JP | 2004222200 A | 8/2004 |
| NZ | WO 0048151 A1 | 8/2000 |
| WO | 98/47117 | 10/1998 |

* cited by examiner

*Primary Examiner* — Chris Parry
*Assistant Examiner* — Alan S Chou
(74) *Attorney, Agent, or Firm* — Michael Best & Friedrich LLP

(57) ABSTRACT

A method of operating a surveillance system includes capturing a sequence of images of a field-of-view. A source of localized motion is disposed within at least one of a plurality of segments of the field-of-view. Provided to an operator is means to enable or disable, for at least one of the segments of the field-of-view, a localized motion identification and notification function wherein localized motion in the segment is automatically identified and distinguished from transient motion, and the operator is automatically notified about the presence of the localized motion.

14 Claims, 11 Drawing Sheets

CONFINED MOTION DETECTION FOR PAN-TILT CAMERAS EMPLOYING MOTION DETECTION AND AUTONOMOUS MOTION TRACKING

RELATED APPLICATION

This application is a nonprovisional of, and claims the benefit of, provisional application 61/291,014, filed Dec. 30, 2009, entitled "Confined Motion Detection for Pan-Tilt Cameras Employing Motion Detection and Autonomous Motion Tracking", by applicant Mark Steven Bell, which is hereby incorporated by reference herein in its entirety.

BACKGROUND OF THE INVENTION

1. Field of the Invention

The present invention relates to a method of using a video camera and, more particularly, to a method of using a video camera to detect motion.

2. Description of the Related Art

Video surveillance camera systems are found in many locations and may include either fixed cameras that have a fixed field-of-view (FOV) and/or adjustable cameras that can pan, tilt and/or zoom to adjust the FOV of the camera. The video output of such cameras is typically communicated to a central location where it is displayed on one of several display screens and where security personnel may monitor the display screens for suspicious activity.

Movable cameras which may pan, tilt and/or zoom may also be used to track objects. The use of a PTZ (pan, tilt, zoom) camera system will typically reduce the number of cameras required for a given surveillance site and also thereby reduce the number and cost of the video feeds and system integration hardware such as multiplexers and switchers associated therewith. Control signals for directing the pan, tilt, zoom movements typically originate from a human operator via a joystick or from an automated video tracking system. An automated video tracking (i.e., "autotracking") system may identify a moving object in the FOV and then track the object by moving the camera such that the moving object is maintained in the central portion of the camera's FOV.

An autotracking system may identify a moving object in the FOV by comparing several sequentially obtained images in the FOV. A change in the content of an individual pixel, or of a localized group of pixels, between sequentially obtained images may indicate the presence of a moving object that needs to be tracked. It is known for an autotracking system to create a "motion mask", which is a pixel-by-pixel quantification of the amount, or probability, of content change in the pixels between sequentially obtained images. By identifying groupings of pixels that have had changes of content between sequentially obtained images, the system can identify a moving object within the FOV.

There have been identified several problems in relation to the use of autotracking systems. For example, the autotracking system may issue an alarm when it detects a suspicious moving object that could possibly be an intruder. A problem, however, is that the system may issue false alarms when it detects "localized movement", i.e., background movement, that the system interprets as a suspicious target. An example of such a source of localized movement is a flag waving in the breeze. A related problem is that the presence of localized movement in the field of view may cause inefficiency in tracking actual suspicious targets. Lastly, the presence of localized movement in the field of view may confuse the system and cause the system to lose track of an actual suspicious target.

Conversely, it is possible that it is localized movement that is from an actual suspicious target, and more generalized movement is of less concern. For example, a surveillance camera monitoring a parking garage may frequently sense generalized movement in the form of people walking in and out of the parking garage. However, more localized movement in the form of a would-be criminal lurking next to a doorway would be more suspicious.

Existing pan-tilt surveillance cameras employed to autonomously track motion require the use of various image processing algorithms. The current state of the art is that such systems that autonomously track motion will continue tracking until motion ceases. FIG. 1 illustrates the operation of a current state of the art pan-tilt camera employing autonomous motion tracking. Any general tracking by the camera, as indicated at 10, causes the operator to be notified. The operator may receive a tracking notification if such is enabled in the system. The operator may be able to act upon such tracking if he is presently monitoring the system. During times of unmonitored system operation, tracking continues until motion stops regardless of whether the system is tracking a person (as intended) or tree branches swaying in the wind (unintended operation). During unattended night operations for example, tracking of tree branches near an employee entrance could cause the system to be unavailable for intended usage (i.e., monitoring the entrance) during the entire night.

Although various prior art systems have addressed the need to provide motion masks in a surveillance camera system, none have addressed the need for human involvement and judgment to discern whether a particular source of localized movement is something suspicious that is to be monitored. Nor have any prior art systems notified a user about the presence of localized movement so that the user is able to become involved and make a judgment about the nature of the localized movement.

What is neither disclosed nor suggested by the prior art is a surveillance camera system that can detect and discern between localized and generalized movement; inform a user of the localized movement and where in the field of view the localized movement has been detected; and allow the user to enable and disable the localized movement identification and notification function for particular segments of the field of view.

SUMMARY OF THE INVENTION

The present invention provides an autonomous tracking mechanism that may distinguish between general motion and localized motion and may subsequently cease unwanted system operation or may notify the system operator of this type of camera operation. The invention may increase long term system availability by detecting the tracking of unintended objects, autonomously ceasing tracking, and autonomously returning the tracking system to intended operation. For example, if bushes, tree limbs, etc. are tracked in windy conditions, such motion may be recognized and the system may be returned to intended operation without operator intervention.

The invention may also enhance system usability by informing the operator of such localized motion. For example, an autonomous tracking system may be employed to watch pedestrians exit into a parking garage. Valid tracking is of people exiting a door and walking to their cars. If a potential thief is lurking in the garage, such lurking motion may be recognized because the motion of people walking from the door to their cars is different from that of a person lurking in a stairwell, for instance. Further, the system operator may be informed about the presence of this specific type of motion.

The invention comprises, in one form thereof, a method of operating a surveillance system, including capturing a sequence of images of a FOV. A source of localized motion is disposed within at least one of a plurality of segments of the FOV. Provided to an operator is means to enable or disable, for at least one of the segments of the FOV, a localized motion identification and notification function wherein localized motion in the segment is automatically identified and distinguished from transient motion, and the operator is automatically notified about the presence of the localized motion.

The invention comprises, in another form thereof, a method of operating a surveillance system, including capturing a sequence of images of a FOV. A source of localized motion is disposed within at least one of a plurality of segments of the FOV. The motion in the field-of-view is detected. The motion is identified as localized motion. An operator is notified of the localized motion. Provided to an operator is means to enable or disable, for at least one of the segments of the field-of-view, a localized motion identification function wherein localized motion in the segment is automatically identified and distinguished from transient motion.

The invention comprises, in yet another form thereof, a method of operating a security system, including using a video camera in the security system to capture images of a monitored area. Localized motion in the captured images is identified. At least one of the captured images is transmitted to an operator disposed at a location remote from the monitored area. The at least one captured image is displayed to the operator. The display includes an indication of an area in which the localized motion has been identified in the at least one captured image. Continued identification of the localized motion is disabled in images of the monitored area that are captured in the future. The disabling is in response to a command from the operator.

An advantage of the present invention is that it advances the state of the art in that the autonomous tracking mechanisms can distinguish between general motion and localized motion and, for example, cease unwanted system operation or notify the system operator of this type of camera operation.

The invention advances the state of the art in that (1) it may greatly increase long term system availability by detecting the tracking of unintended objects, autonomously ceasing tracking, and autonomously returning the tracking system to intended operation, and (2) it may enhance system usability by informing the operator of such localized motion.

An example of (1) above is the tracking of bushes, tree limbs, etc. in windy conditions. Systems employing the current state of the art would continue tracking bushes, tree limbs, etc. until such motion ceases, or upon operator intervention, potentially tying up the system for hours. The system of the present invention recognizes such localized motion and returns the system to intended operation without operator intervention.

An example of (2) above is an autonomous tracking system being employed to watch the pedestrian exit of a parking garage. Valid tracking would be of people exiting the door and walking to their cars. If a potential thief was lurking in the garage, the current state of the art would detect the motion of this individual and simply track him. Because the motion of people walking from the door to their cars is more generalized and less localized than the motion of an individual lurking in a stairwell, the system of the invention is able to recognize and distinguish between the two types of motion and inform the operator as to the specific type of motion that is currently taking place.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
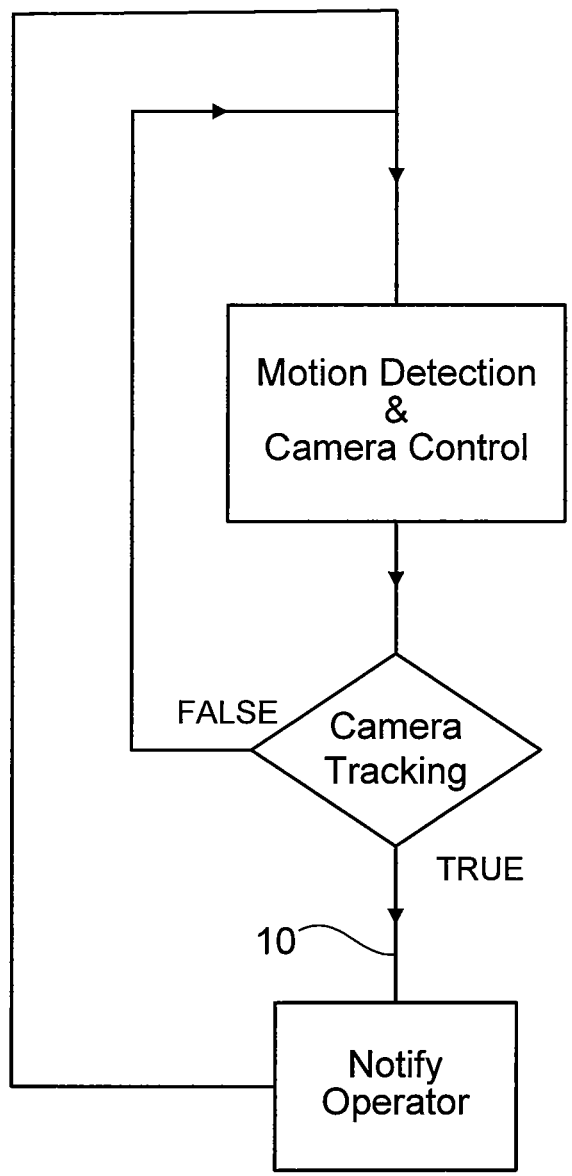
FIG. 1 is a flow chart of the operation of a pan-tilt camera of the prior art employing autonomous motion tracking.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

Figure 2:
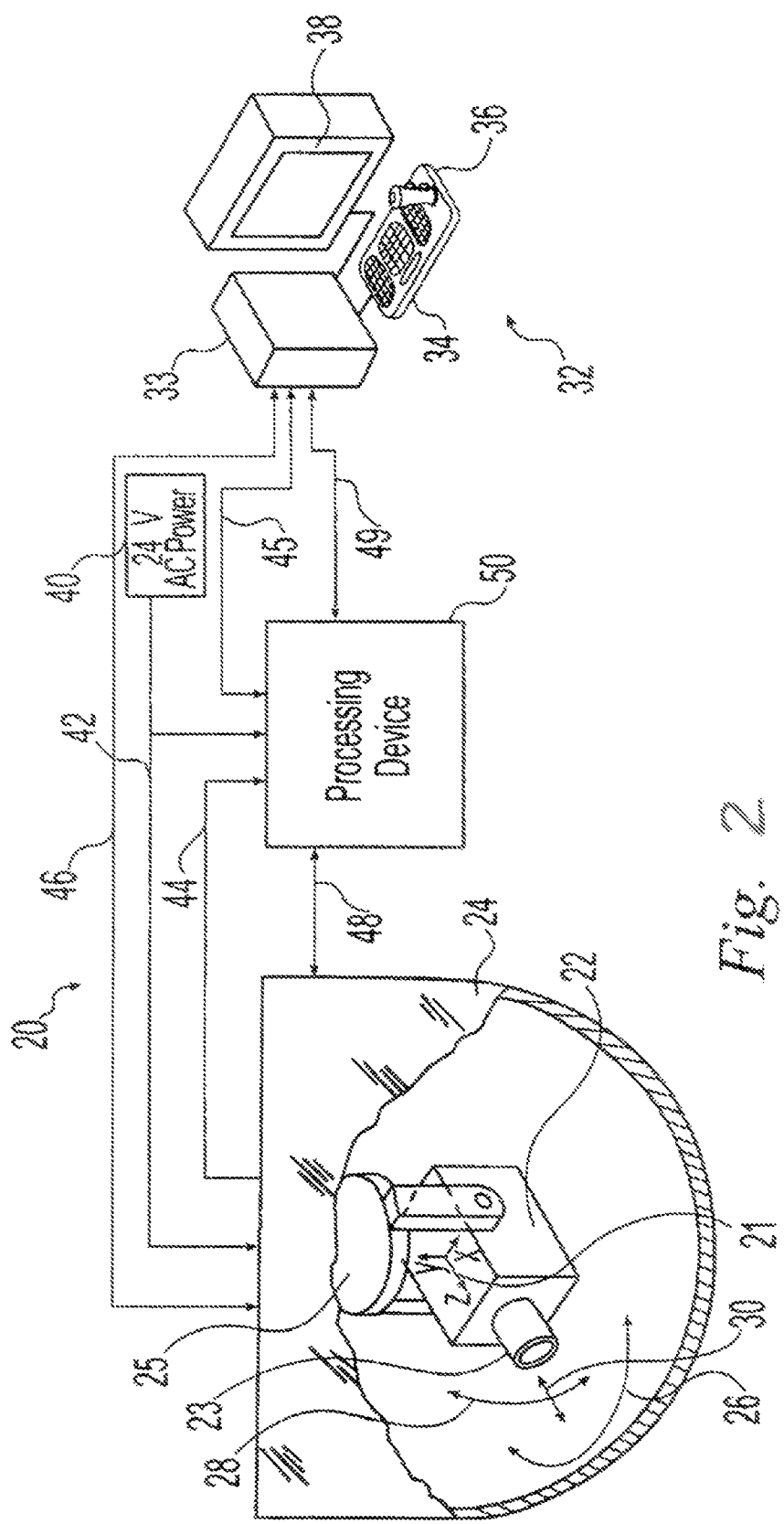
FIG. 2 is a schematic view of a video surveillance system in accordance with the present invention.

In accordance with the present invention, a video surveillance system 20 is shown in FIG. 2. System 20 includes a camera 22 which is located within a partially spherical enclosure 24 and mounted on support 25. Stationary support 25 may take many forms, such as an outwardly extending support arm extending from an exterior edge of a building which may subject the supported camera to unintentional movement resulting from wind, vibrations generated by the camera motors, nearby machinery or a myriad of other sources. Enclosure 24 is tinted to allow the camera to acquire images of the environment outside of enclosure 24 and simultaneously prevent individuals in the environment being observed by camera 22 from determining the orientation of camera 22. Camera 22 includes a controller and motors which provide for the panning, tilting and adjustment of the focal length of camera 22. Panning movement of camera 22 is represented by arrow 26, tilting movement of camera 22 is represented by arrow 28 and the changing of the focal length of the lens 23 of camera 22, i.e., zooming, is represented by arrow 30. As shown with reference to coordinate system 21, panning motion may track movement along the x axis, tilting motion may track movement along the y-axis and focal length adjustment may be used to track movement along the z-axis. In the illustrated embodiment, camera 22 and enclosure 24 may be an AutoDome® brand camera system, such as the G3 or G4 AutoDome® camera and enclosure, which are available from Bosch Security Systems, Inc., having a place of business in Lancaster, Pa. The basic, advanced, or other models of the G3 or G4 AutoDome® camera may be suitable for use in conjunction with the present invention. A camera suitable for use with present invention is described by Sergeant et al. in U.S. Pat. No. 5,627,616 entitled Surveillance Camera System which is hereby incorporated herein by reference.

System 20 also includes a head end unit 32. Head end unit 32 may include a video switcher or a video multiplexer 33. For example, the head end unit may include an Allegiant® brand video switcher available from Bosch Security Systems, Inc., such as a LTC 8500 Series Allegiant® Video Switcher which provides inputs for up to 64 cameras and may also be provided with eight independent keyboards and eight monitors. Head end unit 32 includes a keyboard 34 and joystick 36 for operator input. Head end unit 32 also includes a display device in the form of a monitor 38 for viewing by the operator. A 24 volt A/C power source 40 is provided to power both camera 22 and a processing device 50 that is operably coupled to both camera 22 and head end unit 32.

Illustrated system 20 is a single camera application. However, the present invention may be used within a larger surveillance system having additional cameras which may be either stationary or moveable cameras or some combination thereof to provide coverage of a larger or more complex surveillance area. One or more analog or digital recording devices may also be connected to head end unit 32 to provide for the recording of the video images captured by camera 22 and other cameras in the system.

Figure 3:
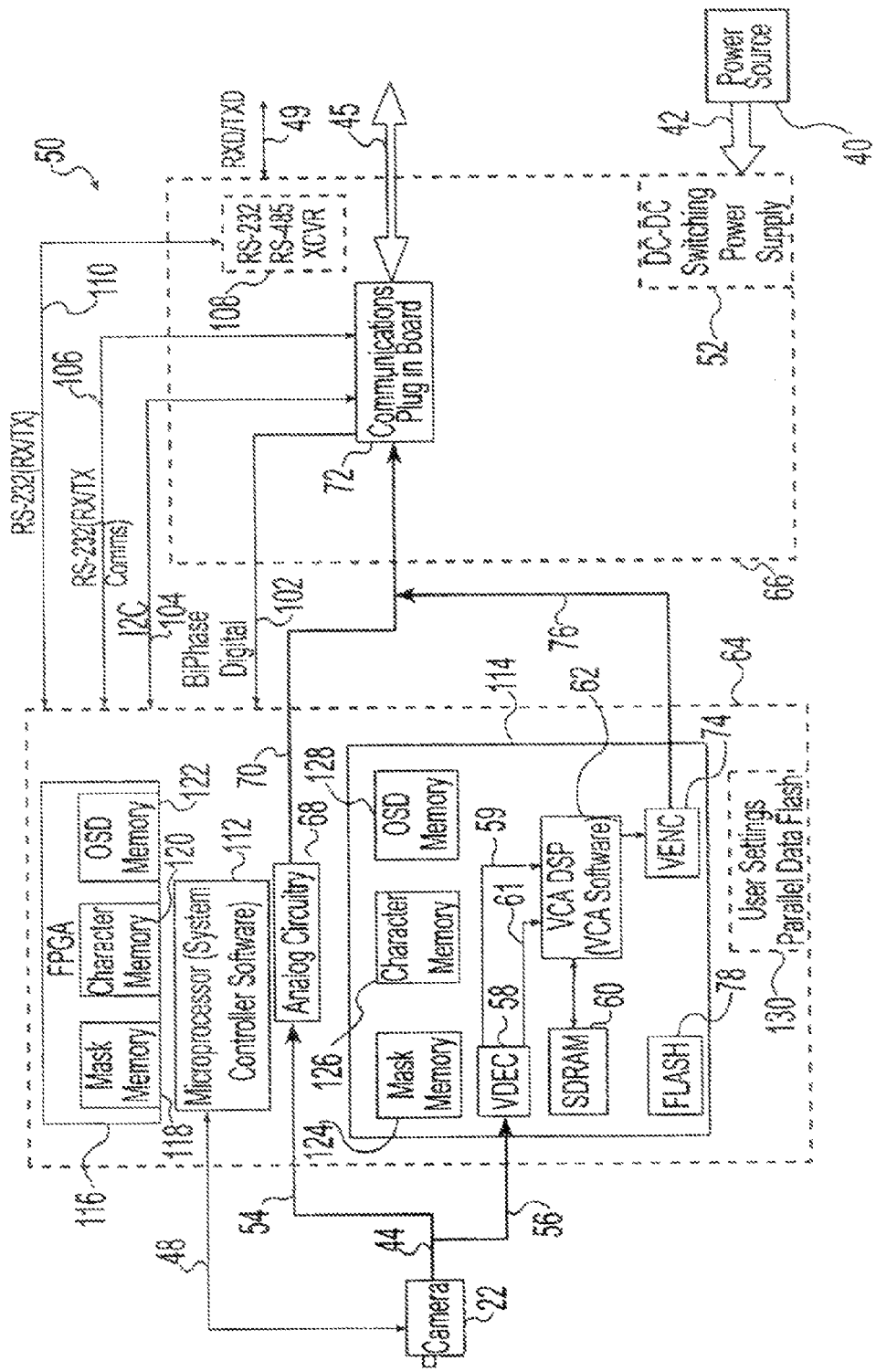
FIG. 3 is a block diagram of the processing device of FIG. 2.

The hardware architecture of processing device 50 is schematically represented in FIG. 3. In the illustrated embodiment, processing device 50 includes a system controller board 64 in communication with a power supply/IO board 66. A power line 42 connects power source 40 to converter 52 in order to provide power to processing device 50. Processing device 50 receives a raw analog video feed from camera 22 via video line 44, and video line 45 is used to communicate video images to head end unit 32. In the illustrated embodiment, video lines 44, 45 are coaxial, 75 ohm, 1 Vp-p and include BNC connectors for engagement with processing device 50. The video images provided by camera 22 can be analog and may conform to NTSC or PAL standards, variations of NTSC or PAL standards, or other video standards such as SECAM. When processing device 50 is inactive, i.e., turned off, video images from camera 22 can pass through processing device 50 to head end unit 32 through analog video line 54, analog circuitry 68, analog video line 70 and communications plug-in board 72. Board 72 can be a standard communications board capable of handling biphase signals associated with a Bosch physical interface and communications protocol for sending setup and control data to a pan and tilt or to an AutoDome®. Board 72 may be capable of handling a coaxial message integrated circuit (COMIC) Bosch proprietary control data over video protocol. Board 72 may be capable of handling a bi-directional communications protocol such as Bilinx™ for sending two-way communication over video links, such as by sending setup and control data to an AutoDome® over the video signal.

Via another analog video line 56, a video decoder/scaler 58 receives video images from camera 22 and converts the analog video signal to a digital video signal and separates the luminance (Y) component from the chrominance (U, V) components of the composite, color video signal. Video decoder/scaler 58 sends a full resolution (unsealed) digital video signal 59 to a video capture port of the VCA DSP 62. Video decoder/scaler 58 also sends a scaled (sub-sampled horizontally by 4 and vertically by 4) QCIF image 61 produced by its scaler function to a second video capture port of VCA DSP 62. SDRAM memory 60 connects directly to VCA DSP 62 and provides volatile memory to store and execute the VCA software after boot, and to provide temporary memory storage. This temporary storage includes, but is not limited to the storage of, video buffers. Video stabilization is performed in VCA DSP 62. The adjusted display image is sent via a DSP video display port to video encoder 74 where the chrominance and luminance components of the digital video signal are re-combined and the video signal is converted to an analog composite video signal. The resulting annotated analog video signal is sent via analog video lines 76 and 70 to communications plug-in board 72, which then sends the signal to head end unit 32 via video line 45.

In the illustrated embodiment, video input to system controller board 64 is limited to about 1.1 Vp-p. If the video signal exceeds 1.1 Vp-p without a proportional increase in sync level, then it will be clipped to about 1.1 Vp-p. If the video signal including the sync level is increased the video decoder/scaler 58 will attempt to compensate by reducing the video gain in order to regulate the sync level. However, alternative embodiments having a greater or lesser capacity may also be employed with the present invention. Processor 62 may be a TMS320DM642 programmable Video/Imaging Fixed-Point Digital Signal Processor available from Texas Instruments. At start up, processor 62 loads a bootloader program. The boot program then copies the VCA application code from a memory device such as flash memory 78 to SDRAM 60 for execution. In the illustrated embodiment, flash memory 78 provides four megabytes of memory and SDRAM 60 provides thirty-two megabytes of memory. In the illustrated embodiment, at most 4 MBytes of the 32 MBytes of SDRAM will be required to execute code and the remaining 28 MBytes of SDRAM is available for video buffers and other use.

In the embodiment shown in FIG. 3, system controller board 64 is connected to communications plug-in board 72 via a biphase digital data bus 102, an I2C data bus 104, and an RS-232 data bus 106. System controller board 64 is connected to an RS-232/RS-485 compatible transceiver 108 via RS-232 data bus 110. A line 49, which can be in the form of an RS-232 debug data bus, communicates signals from head end unit 32 to processing device 50. The signals on line 49 can include signals that can be modified by processing device 50 before being sent to camera 22. Such signals may be sent to camera 22 via line 48 in communication with microprocessor 112. Microprocessor 112 can operate system controller software and can communicate with VCA DSP 62 by means of a 16-bit interface such as the DSP's Host Peripheral Interface (HPI-16). Thus, VCA components such as VCA DSP 62 can send signals to camera 22 via microprocessor 112 and line 48.

System controller board 64 may also include a field programmable gate array 116 including a mask memory 118, a character memory 120, and an on screen display (OSD) memory 122. Similarly, VCA components 114 may include a mask memory 124, a character memory 126, and an on screen display (OSD) memory 128. These components may be used to mask various portions of the image displayed on screen 38 or to generate textual displays for screen 38. Finally, system controller board 64 can include a parallel data flash memory 130 for storage of user settings.

In the illustrated embodiment, the only necessary commands conveyed to processing device 50 that are input by a human operator may be on/off commands and PTZ commands. However, even these on/off commands and PTZ commands may be automated in alternative embodiments. According to the present invention, non-automated commands may also be provided by a human operator for enabling or disabling, for each of a plurality of segments (e.g., areas) of the FOV, a localized motion identification and notification function. Localized motion in each of the segments may be automatically identified and distinguished from transient motion, and the operator may be automatically notified about the presence of the localized motion.

The above-described on/off commands, enable/disable commands, and other serial communications are conveyed via bi-phase line 46 between head end unit 32 and camera 22, and between processing device 50 and camera 22 via line 48. In the illustrated embodiment, processing device 50 is mounted proximate camera 22. However, processing device 50 may also be mounted employing alternative methods and at alternative locations. Alternative hardware architecture may also be employed with processing device 50. Such hardware should be capable of running the software and processing at least approximately five frames per second for good results. It is also noted that by providing processing device 50 with a sheet metal housing, its mounting on or near a PTZ camera is facilitated and system 20 may thereby provide a stand-alone embedded platform which does not require a personal computer-based image stabilization system. If desired, however, the present invention may also be employed using a personal computer based system.

Processing device 50 can perform several functions, including capturing video frames acquired by camera 22, identifying a stationary feature in the video frames, determining the intended change in the camera FOV based upon signals sent to or received from camera 22, identifying a stationary feature and determining the actual change in the camera FOV, comparing the intended and actual change in the camera FOV to determine the magnitude of the image translations resulting from the unintentional motion of the camera and selecting display image coordinates to counteract the translations resulting from the unintentional motion of the camera. Processing device 50 may also be used to perform an automated tracking function. For example, processing device 50 may also provide an automated tracking system wherein processing device 50 is used to identify moving target objects in the FOV of the camera and then generate control signals which adjust the pan, tilt and zoom settings of the camera to track the target object and maintain the target object within the FOV of the camera. As the pan, tilt and zoom settings of the camera are automatically adjusted to track the target object, the images displayed by the system may be stabilized by utilizing an image stabilization system. An example of an automated tracking system that may be employed by system 20 is described in U.S. patent application Ser. No. 10/306,509 filed on Nov. 27, 2002 entitled "VIDEO TRACKING SYSTEM AND METHOD" the disclosure of which is hereby incorporated herein by reference. An image stabilization system in accordance with the present invention may also be employed to stabilize images wherein the camera is being manually adjusted, such as by the manual manipulation of joystick 36 or in other applications.

Figure 4:
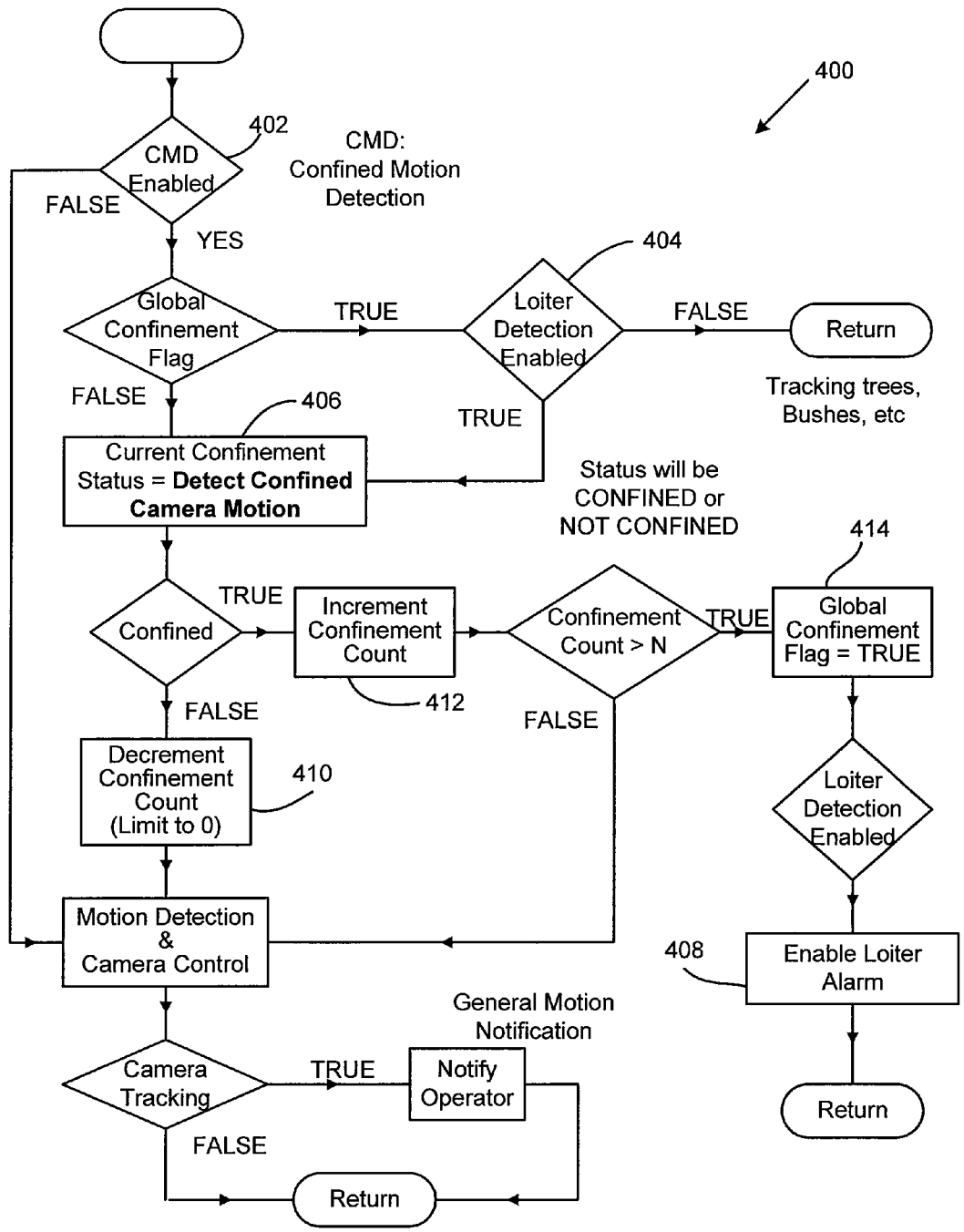
FIG. 4 is a flow chart illustrating one embodiment of a method of the present invention for operating a surveillance camera.

One embodiment of a method 400 of the present invention for operating a surveillance camera is illustrated in FIG. 4. In a first step 402, it is determined whether the user has enabled or disabled Confined Motion Detection (CMD) processing. Because the motions of a camera that is tracking tree branches in the wind are the same as that of a camera that is tracking a person loitering near a doorway, CMD processing may enable the system operator to specify what action the autonomous tracking system is to execute upon detection of confined motion.

If, in step 404, it is determined that "Loiter Detection" is enabled, then the system may be informed to continue tracking the confined motion (step 406) and to also set a separate alarm ("Loiter Alarm"; step 408). This type of operation would be desired if confined motion were detected near a doorway after business hours, for example.

If, on the other hand, "Loiter Detection" is disabled, then the system is informed to cease tracking the confined motion after the confined motion has been occurring for an operator-specified time interval. Tracking of tree branches swaying in the wind is an example of an application in which it may be desirable to choose this option of disabling "Loiter Detection."

The "Confinement Count", which is decremented in step 410 and incremented in step 412, is used by the system to dynamically determine when confined motion has been detected over a specified time interval. This aids the system in discriminating between localized and more transient motion. For example, if the system is tracking tree branches swaying in the wind, and a person walks in front of the tree, the camera will start tracking the person, resulting in a decrement of this counter (step 410), which will ensure that the Global Confinement Flag is not set in step 414.

Figure 5A:
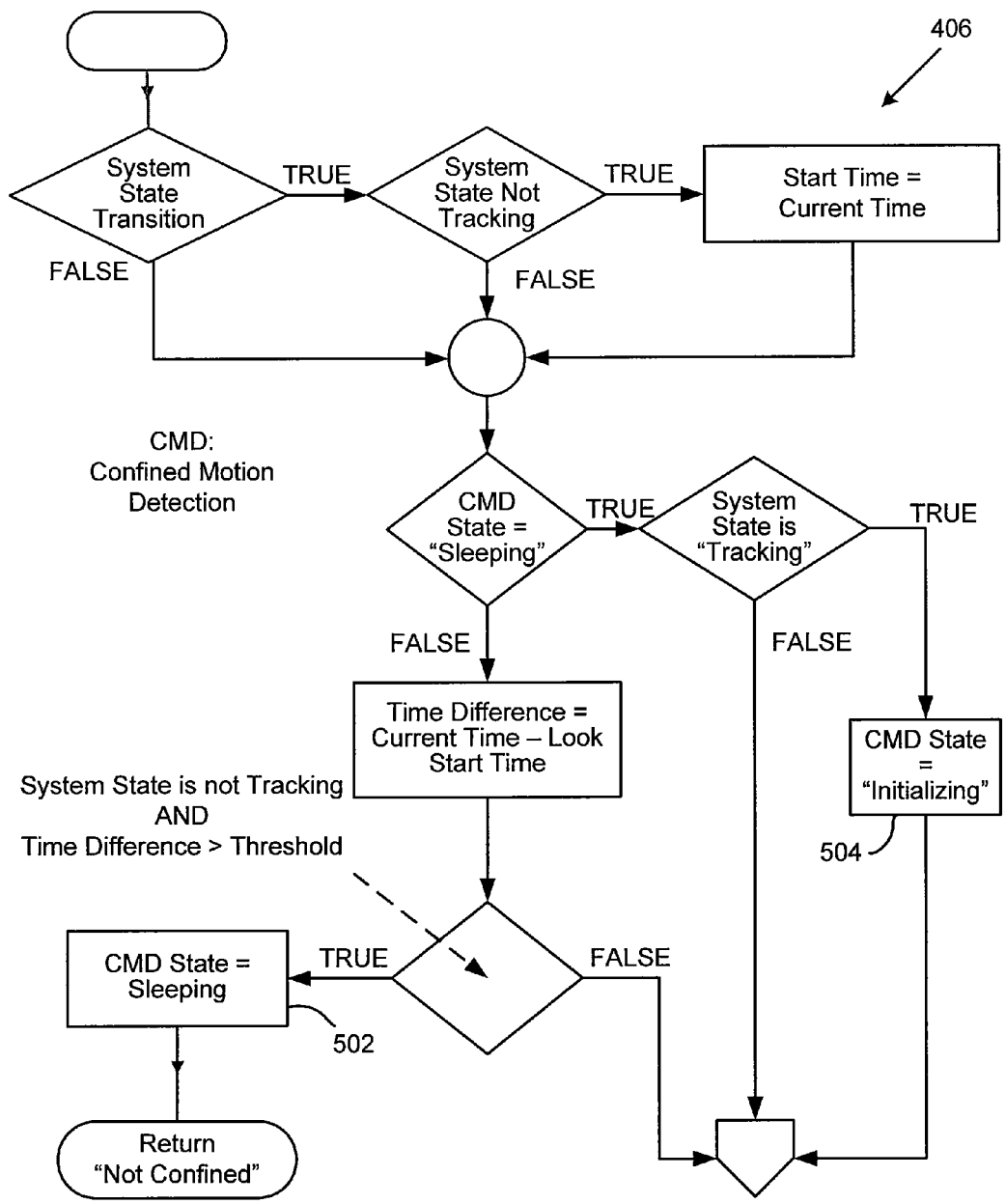
FIG. 5a is a flow chart illustrating details of the "Detect Confined Camera Motion" step of the method of FIG. 4.
Figure 5B:
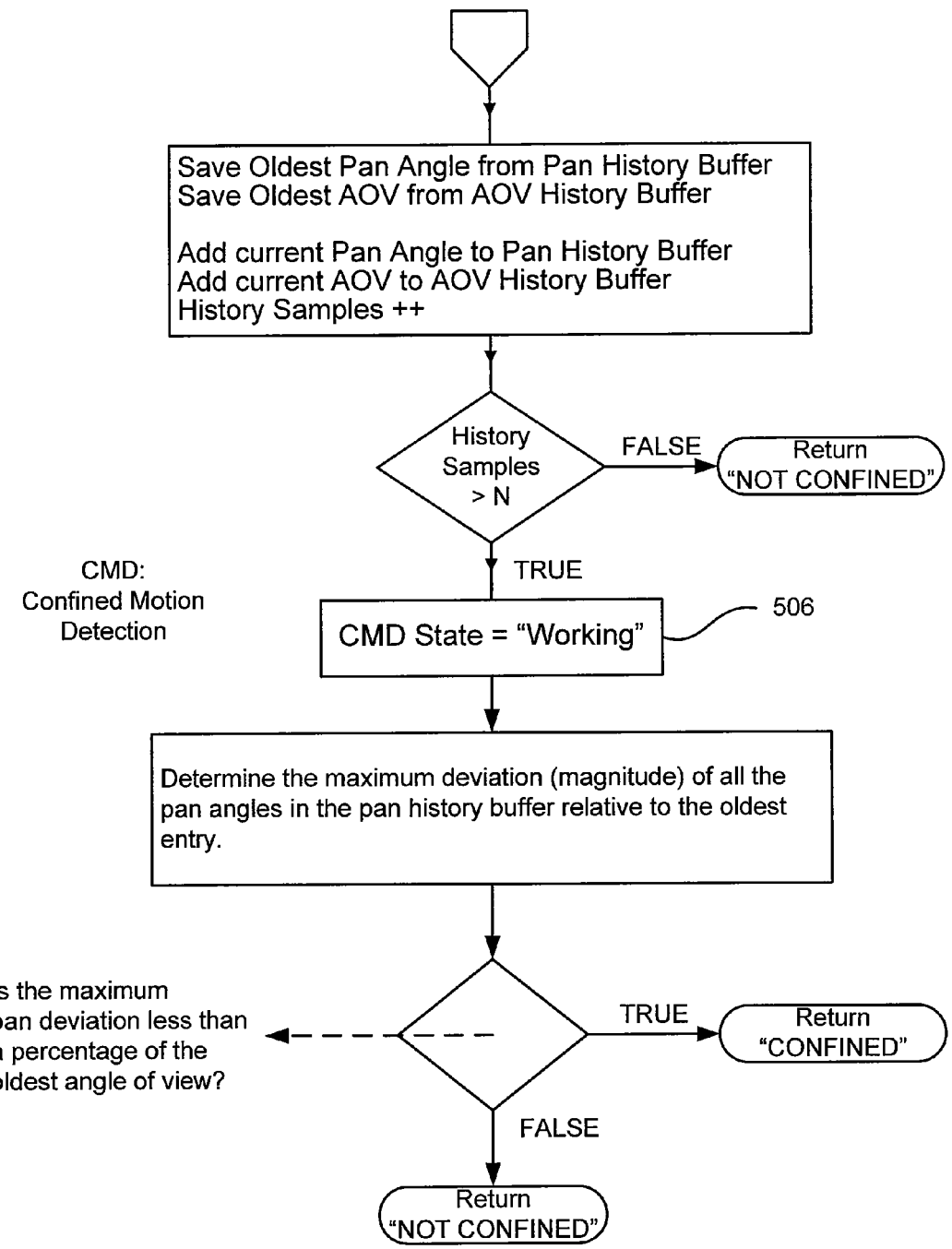
FIG. 5b is a flow chart illustrating further details of the "Detect Confined Camera Motion" step of the method of FIG. 4.

FIGS. 5*a-b* provide more details of step 406 in FIG. 4. If the autonomous tracking pan-tilt-zoom (PTZ) camera system is not currently in the tracking state, then the system can be considered to be in a "Looking" state. While in the "Looking" state, CMD processing may be considered to be in the "Sleeping" state (step 502).

Upon detection of any motion that results in the initiation of tracking by the camera system, the CMD processing enters the "initializing" CMD state (step 504). During the "Initializing" CMD state, the CMD software may fill two history buffers. One history buffer contains a time interval of camera pan angles, while the other history buffer contains a corresponding time interval of camera Angle of Views (AOV). Once these buffers are filled, the CMD software enters the "Working" state (step 506).

Figure 6:
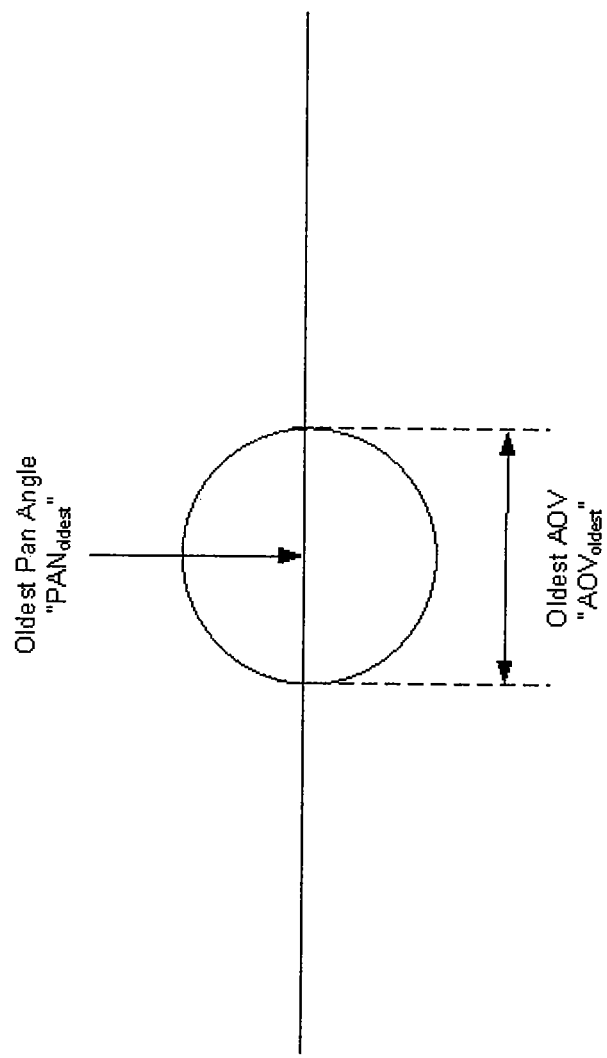
FIG. 6 is a diagram illustrating a method of determining whether the system of the invention is in confined motion.

During each iteration of the camera system while the CMD software is in the "Working" state, the oldest (temporally) pan angle and associated AOV (FIG. 6) are saved, then replaced by the current camera pan angle and AOV. Next, all the pan angles in the history buffer are scanned and the maximum deviation (magnitude) between the saved (oldest) pan angle and all history buffer entries is determined.

$$\text{Maximum Pan Deviation} = \text{MAX}[|\text{Pan}_{oldest} - \text{Pan}_0|, |\text{Pan}_{oldest} - \text{Pan}_1|, \ldots |\text{Pan}_{oldest} - \text{Pan}_N|]$$

Where N is the depth of the history buffers.

If the maximum pan deviation is less than a threshold percentage of the saved (oldest) camera AOV, then the system may be considered to be in confined motion. Conversely, if the maximum deviation is over the threshold percentage of the saved (oldest) camera AOV, then the system may be considered to not be in confined motion.

Each time the CMD determines that the camera is moving in confined motion, the "Confinement Count" is incremented, as in step 412 (FIG. 4). Likewise, each time the CMD determines that the camera is not moving in confined motion, the "Confinement Count" is decremented, as in step 410.

In a particular embodiment, the camera may be considered to be in Confined Motion if:

Maximum Pan Deviation≤$AOV_{oldest}$

Figure 7:
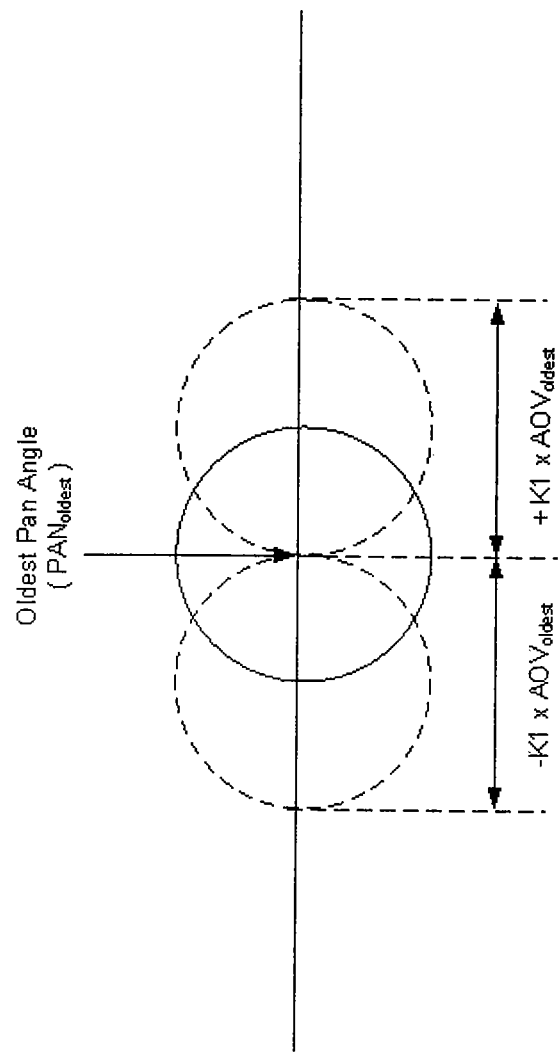
FIG. 7 is another diagram illustrating a method of determining whether the system of the invention is in confined motion.

The general test for Confined Motion may be stated as:

Maximum Pan Deviation≤($K1×AOV_{oldest}$), as illustrated in FIG. 7.

wherein the Angle of view may be computed as:

AOV=2×Tan$^{-1}$(CCDwidth/(2×FL))

wherein CCDwidth is the width of the CCD inside the camera, and FL is the current Focal Length of the camera.

Additional improvements in Constrained Motion Detection are possible if the constant $K_1$ is a function of the camera's focal length. For example, for long focal lengths (i.e., small AOV), $K_1$ might be 2 or 3. For short focal lengths (i.e., wide AOV), $K_1$ might be on the order of 0.5.

Figure 8:
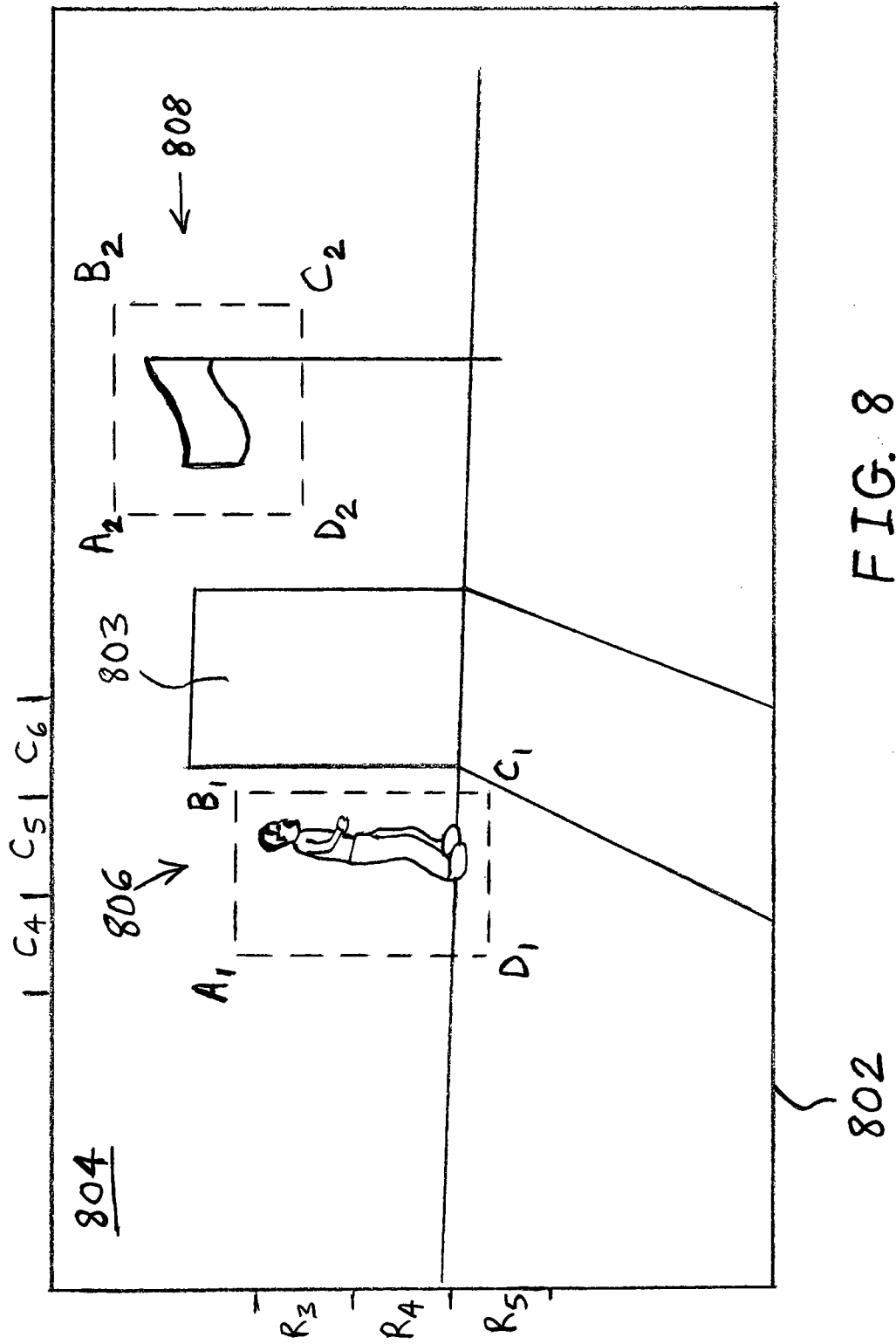
FIG. 8 is a plan view of an image captured by the camera of the video surveillance system of FIG. 2 and displayed on a video screen.

FIG. 8 illustrates an image that has been acquired by camera 22 and that is being displayed on a video screen 802. The image includes a doorway 803 of a building 804 and two sources of localized motion in the form of a loiterer 806 and a flag 808 that is rippling in the wind. System 20 may identify both loiterer 806 and flag 808 as sources of localized motion. System 20 may then notify the human user that the sources of localized motion have been identified. For example, an audio or text message may be sent to the user informing him that localized motion has been detected. In addition, or alternatively, the sources of localized motion may be highlighted in yellow on the display; a rectangular border may be framed around the localized motion; and/or the highlighting and border may flash on and off. For example, the display on screen 802 may include a rectangular frame joining points $A_1, B_1, C_1$ and $D_1$ around loiterer 806, as well as a rectangular frame joining points $A_2, B_2, C_2$ and $D_2$ around flag 808. As another alternative, system 20 may provide the user with the grid coordinates of the localized movement. For example, the user may be informed that localized movement has been identified in the 3×3 matrix of cells within columns $C_{4-6}$ and rows $R_{3-5}$, i.e., where loiterer 806 has been located.

Regardless of how system 20 informs the user of the presence of localized movement, the user may choose to enable or disable the further detection of the identified localized motion. In one embodiment, the user may select segments of the FOV in which the identification and subsequent user notification of the localized movement is to be enabled or disabled. For instance, the user may decide that flag 808 is not of interest, but loiterer 806 is of interest. Thus, the user may enable identification and notification of localized movement in the segment defined by points $A_1, B_1, C_1$ and $D_1$, but may disable the same in the segment defined by points $A_2, B_2, C_2$ and $D_2$. Alternatively, the user may select one or more segments in a grid in which to enable/disable identification and notification of localized movement. In the particular example in FIG. 8, the user may select the nine segments represented by the nine cells within the matrix defined by columns $C_{4-6}$ and rows $R_{3-5}$ as being enabled for continuing identification and notification of localized movement.

In another embodiment, the user may draw a visual representation of the segments or segments that he selects for being enabled/disabled for further identification of localized movement therein and notification to the user. In one embodiment, the user selects vertices A, B, C, D of a segment on screen 802 such as by use of joystick 36 or a computer mouse (not shown). After the user has selected vertices A-D, processing device 50 may add to the display visible boundary lines (or dashed lines as shown in FIG. 8) which join adjacent pairs of the vertices.

Processing device 50 may analyze and compare a number of images that have been sequentially acquired to thereby sense movement within the acquired images. For example, by comparing the image of FIG. 8 with the subsequently acquired image of the same scene, processing device 50 may sense the movement of flag 808 and of person 806. More particularly, each of the images may be acquired as a matrix of pixels, as is well known. Processing device 50 may compare corresponding pixels in the sequentially acquired images in order to determine if the content of each particular pixel changes from image-to-image. If the content of a pixel does change from image-to-image, then it may be an indication that there is movement within that particular pixel.

Figure 9:
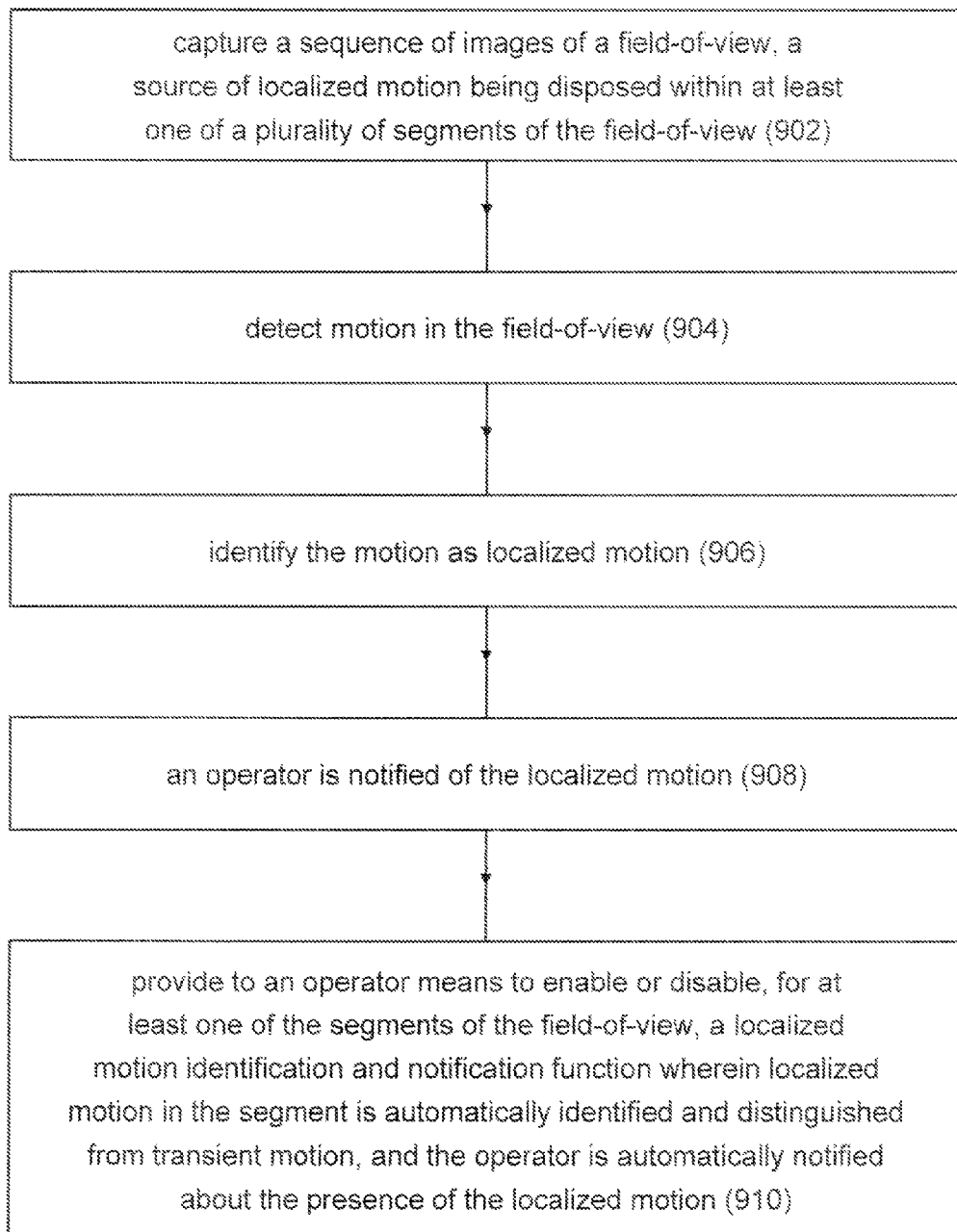
FIG. 9 is a flow chart of one embodiment of a method of the present invention for operating a security system.

One embodiment of a method 900 for operating a surveillance system is shown in FIG. 9. In a first step 902, a sequence of images of a field-of-view is captured. A source of localized motion is disposed within at least one of a plurality of segments of the field-of-view. For example, camera 22 may capture a sequence of images, including the image shown in FIG. 8, with camera 22 maintaining the same FOV. As described above, a source of localized motion in the form of loiterer 806 is disposed in a segment defined as being within rectangle $A_1, B_1, C_1, D_1$, of the FOV.

In a next step 904, the motion in the FOV is detected. That is, processor 50 may analyze the sequence of images and find a pattern in the changes in the individual pixels in the sequential images that indicates to processor 50 the presence of motion.

In step 906, the motion is identified as localized motion. For example, processor 50 may ascertain that the motion found in step 904 is confined to one or more particular segments of the FOV. Continuing the example above, processor 50 may determine that the motion of loiterer 806 is confined with in the segment defined by rectangle $A_1, B_1, C_1, D_1$. In view of the motion being confined to one or more particular segments of the FOV, processor 50 may classify the motion as being localized.

Next, in step 908, an operator is notified of the localized motion. After localized motion in the segment has been automatically identified and distinguished from transient motion, the operator is automatically notified about the presence of the localized motion. That is, system 20 may automatically notify the human operator via audio messages, text messages, and/or graphical indications on the display screen about the detected presence of localized movement within rectangles $A_1, B_1, C_1, D_1$ and $A_2, B_2, C_2$ and $D_2$.

In a next step 910, provided to an operator are means to enable or disable, for at least one of the segments of the field-of-view, a localized motion identification and notification function. Localized motion in the segment is automatically identified and distinguished from transient motion, and the operator is automatically notified about the presence of the localized motion. The operator then may choose to enable or disable further identification or monitoring of the localized motion, and may further enable or disable the function of notifying the operator about future instances of the localized motion. The operator may visually evaluate the sources of localized motion on the display screen (e.g., loiterer 806 and flag 808) in terms of whether those sources are of enough interest to warrant further monitoring. The operator may base his enablement/disablement decisions based on how interesting each individual source is to the operator. The operator may consider loiterer 806 to be a potential thief who needs to be monitored, and thus may enable the segment represented by rectangle $A_1, B_1, C_1, D_1$. On the other hand, the operator may have no interest in flag 808, and thus may disable the segment represented by rectangle $A_2, B_2, C_2, D_2$. The operator may perform such enablement/disablement by entering text commands with a keyboard, clicking on the corresponding segment of the display screen by use of a computer mouse, clicking on icons on the display screen, or by voice commands, for example.

Figure 10:
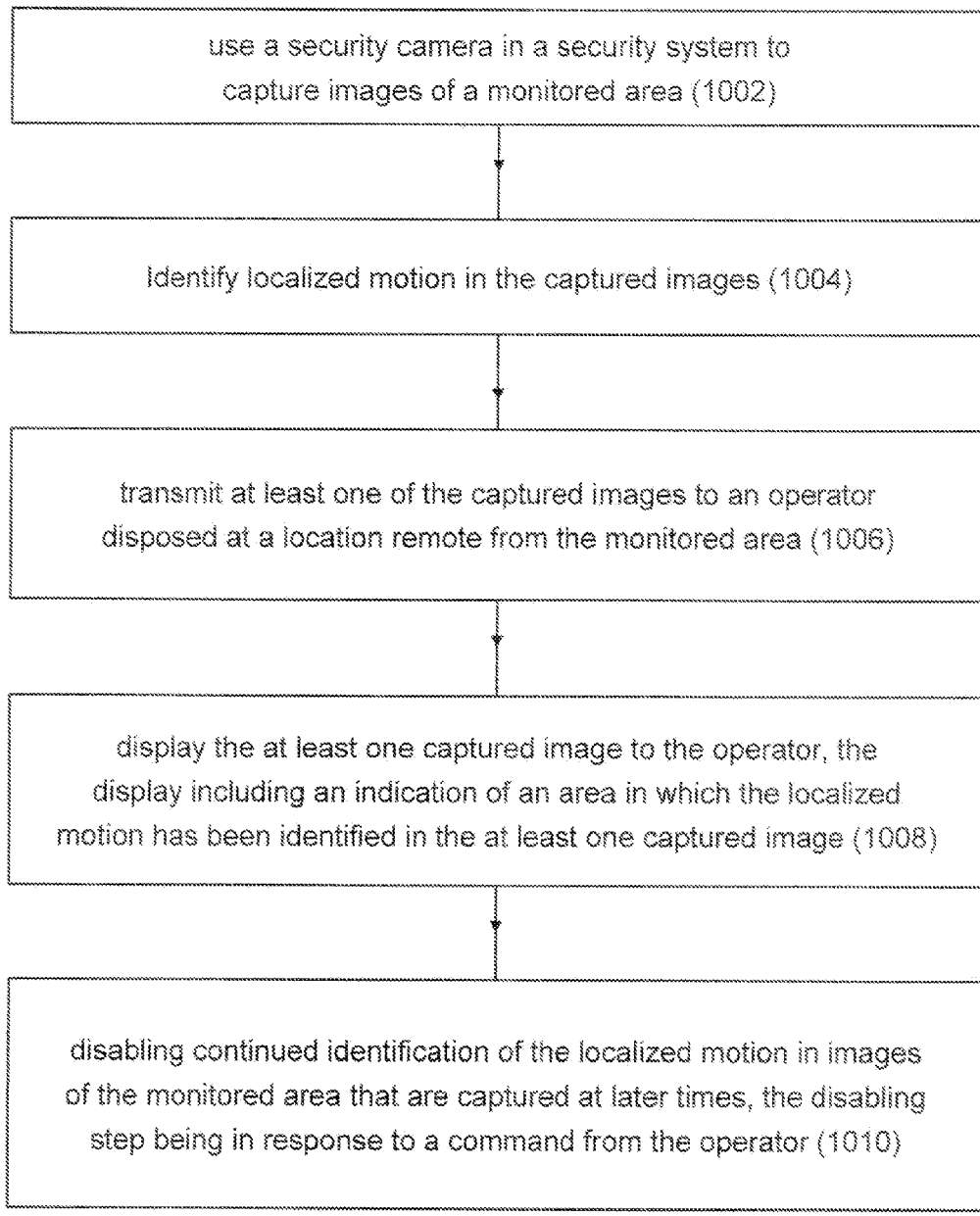
FIG. 10 is a flow chart of another embodiment of a method of the present invention for operating a security system.

Another embodiment of a method 1000 for operating a surveillance system is shown in FIG. 10. In a first step 1002, a video camera in the security system is used to capture images of a monitored area. That is, camera 22 in security system 20 may capture the image shown in FIG. 8 of a monitored area outside of a doorway 803.

Next, in step 1004, localized motion in the captured images is identified. For example, processor 50 may identify movement of loiterer 806 as being localized motion on the basis of him not moving beyond the bounds of rectangle $A_1$, $B_1$, $C_1$, $D_1$, or rarely do so, during a specific period of time (e.g., 60 seconds).

In a next step 1006, at least one of the captured images is transmitted to an operator who is disposed at a location that is remote from the monitored area. For example, camera 22 may transmit captured images to a display screen 38 that is disposed at least several hundred yards away from building 804. A human operator may be within viewing distance of screen 38.

In step 1008, at least one captured image is displayed to the operator. The display includes an indication of an area in which the localized motion has been identified in the at least one captured image. That is, the transmitted captured images may be displayed on screen 38 for viewing by the human operator. The display may include a set of flashing dashed lines joining the vertices of $A_2$, $B_2$, $C_2$, $D_2$. The flashing dashed lines may be used to indicate that localized movement has been identified within rectangle $A_2$, $B_2$, $C_2$, $D_2$.

In a final step 1010, continued identification of the localized motion is disabled in images of the monitored area that are captured in the future. This disabling step is in response to a command from the operator. For example, the operator may use a computer mouse to click on an area within the set of flashing dashed lines joining the vertices of $A_2$, $B_2$, $C_2$, $D_2$. This clicking may serve as a command to system 20 to no longer monitor, track, and/or identify localized motion within rectangle $A_2$, $B_2$, $C_2$, $D_2$. The operator may choose to give this command because he sees in the display that the localized motion is provided by the rippling of flag 808, which the operator may deem to be of no consequence.

While this invention has been described as having an exemplary design, the present invention may be further modified within the spirit and scope of this disclosure. This application is therefore intended to cover any variations, uses, or adaptations of the invention using its general principles.

What is claimed is:

1. A method of operating a surveillance system, the method including:
    capturing a sequence of images of a field-of-view, a source of localized motion being disposed within at least one of a plurality of segments of the field-of-view;
    providing to an operator means to enable or disable, for at least one of the segments of the field-of-view, a localized motion identification and notification function wherein localized motion in the segment is automatically identified and distinguished from transient motion, and the operator is automatically notified about the presence of the localized motion;
    upon detection of motion that results in initiation of tracking, of:
        filling a first history buffer with pan angles; and
        filling a second history buffer with camera Angle of Views;
    entering a working state after the first and second history buffers are filled;
    determining a maximum deviation of all the pan angles in the first history buffer relative to an oldest said pan angle in the first history buffer; and
    identifying localized motion only if the maximum deviation is less than a threshold percentage of an oldest said camera Angle of View in the second history buffer.

2. The method of claim 1 wherein the disablement of the localized motion identification and notification function causes tracking of localized motion to cease after the localized motion has been occurring for an operator-specified time interval.

3. The method of claim 1 comprising the further step of identifying the localized motion based upon detected motion being confined to at least one of the segments for more than a threshold period of time.

4. A method of operating a surveillance system, the method including:
    capturing a sequence of images of a field-of-view, a source of localized motion being disposed within at least one of a plurality of segments of the field-of-view;
    detecting the motion in the field-of-view;
    identifying the motion as localized motion when the motion is confined to at least one of the plurality of segments of the field-of-view for more than a predetermined time;
    notifying an operator of the localized motion;
    providing to an operator means to enable or disable, for the at least one of the segments of the field-of-view, a localized motion identification function, wherein localized motion in the segment is automatically identified and distinguished from transient motion,
    upon detection of motion that results in initiation of tracking, of:
        filling a first history buffer with pan angles;
        filling a second history buffer with camera Angle of Views;
    entering a working state after the first and second history buffers are filled;
    determining a maximum deviation of all the pan angles in the first history buffer relative to an oldest said pan angle in the first history buffer; and
    identifying localized motion only if the maximum deviation is less than a threshold percentage of an oldest said camera Angle of View in the second history buffer.

5. The method of claim 4 comprising the further step of providing a localized motion notification function, wherein the operator is automatically notified about the presence of the localized motion.

6. The method of claim 4 comprising the further step of displaying at least one said image of the field-of-view to the operator.

7. The method of claim 4 wherein the disablement of the localized motion identification function causes tracking of localized motion to cease after the localized motion has been occurring for an operator-specified time interval.

8. The method of claim 4 wherein the notifying step includes transmitting a video signal based upon at least one of the captured images to a remote location for viewing by the operator.

9. A method of operating a security system, comprising the steps of:
   using a video camera in the security system to capture images in a field of view of a monitored area, the field of view including a plurality of segments;
   identifying localized motion in at least one of the plurality of segments of the captured images;
   transmitting at least one of the captured images to an operator disposed at a location remote from the monitored area;
   displaying the at least one captured image to the operator, the display including an indication of an area where at least one of the segments in which the localized motion has been identified in the at least one captured image;
   disabling continued identification of the localized motion in the images of the monitored area that are captured at later times, the disabling step being in response to a command from the operator, wherein the disabling of the continued identification of the localized motion causes tracking of localized motion to cease only after the localized motion has been occurring for an operator-specified time interval in the segment;
   upon detection of motion that results in initiation of tracking, of:
      filling a first history buffer with pan angles; and
      filling a second history buffer with camera Angle of Views;
   entering a working state after the first and second history buffers are filled; and
   determining a maximum deviation of all the pan angles in the first history buffer relative to an oldest said pan angle in the first history buffer, wherein the localized motion is identified only if the maximum deviation is less than a threshold percentage of an oldest said camera Angle of View in the second history buffer.

10. The method of claim 9 wherein the step of identifying the localized motion is based upon detected motion being confined to at least one of the segments of a field-of-view for more than a threshold period of time.

11. The method of claim 9 comprising the further step of automatically notifying the operator about the presence of the localized motion.

12. A method of operating a surveillance system, comprising the steps of:
   using a video camera in the surveillance system to capture images in a field of view of a monitored area, the field of view including a plurality of segments;
   identifying localized motion in one of the plurality of segments of the captured images;
   identifying a transient motion across the plurality of segments;
   transmitting at least one of the captured images to an operator disposed at a location remote from the monitored area;
   displaying the at least one captured image to the operator, the display including an indication of an area where one of the segments in which the localized motion has been identified in the at least one captured image;
   displaying the at least one captured image corresponding to a transient motion; and
   disabling continued identification of the localized motion in the images of the monitored area that are captured at later times, the disabling step being in response to a command from the operator, wherein the disabling of the continued identification of the localized motion causes tracking of localized motion to cease only after the localized motion has been occurring for an operator-specified time interval in the segment;
   upon detection of motion that results in initiation of tracking, of:
      filling a first history buffer with pan angles; and
      filling a second history buffer with camera Angle of Views;
   entering a working state after the first and second history buffers are filled; and
   determining a maximum deviation of all the pan angles in the first history buffer relative to an oldest said pan angle in the first history buffer.

13. The method of claim 12, wherein ceasing tracking of the localized motion enables the surveillance system to enter a looking state.

14. The method of claim 12, comprising the step of:
   identifying localized motion only if the maximum deviation is less than a threshold percentage of an oldest said camera Angle of View in the second history buffer.

* * * * *